INVENTOR.
JOHN S. SUTTON
BY John L. Jackson
ATTORNEY

April 27, 1965 J. S. SUTTON 3,181,046

GATED PULSE AMPLIFIER SERVOMECHANISM

Filed July 2, 1962

2 Sheets-Sheet 2

United States Patent Office 3,181,046
Patented Apr. 27, 1965

3,181,046

GATED PULSE AMPLIFIER SERVOMECHANISM

John S. Sutton, San Jose, Calif., assignor to International Business Machines Corporation, New York, N.Y., a corporation of New York Filed July 2, 1962, Ser. No. 206,645
8 Claims. (Cl. 318—28)

This invention relates to servomechanisms in general and more particularly to a servomechanism wherein the error signal and velocity signal are utilized to control the time-wise position of a control pulse which is applied to silicon control rectifiers which supply power to the associated servomotor.

Recently, a wide spread use has been made of silicon control rectifiers as sources of power to drive a servomotor. In the usual servomechanism, two silicon control rectifiers are associated with each motor winding to enable utilization of full A.C. power. The usual method of driving each of the pair of silicon control rectifiers is by means of a pulse position control mechanism associated with each pair of silicon control rectifiers. The pulse position control mechanism receives a signal from, for instance, a difference amplifier which signal is indicative of both position error and velocity. This input signal is applied to the control winding of a phase shifting-pulse forming network to provide a gating pulse each half-cycle, the position of which is dependent upon the input current to the phase shifting-pulse forming system. Traditionally, two phase shifting-pulse forming systems have been used in each sevromechanism, i.e., one phase shifting-pulse forming system for each of the motor windings to allow bi-directional movement. It has also been the practice heretofore to shift the control or gating pulse to the crossover point of the A.C. waveform applied to the motor winding which is not in use rather than positively disconnecting the motor winding from the power source.

Problems encountered in the use of two phase shifting-pulse forming systems are that even though the position of the gating pulse is moved to the crossover point of the A.C. signal in the side of the servomechanism which is not being powered, as a practical matter some power is always being applied to that side due to the normal practice of providing a slight positive control current which results in the gating pulse being slightly off of the crossover point to narrow the dead band of the system. That is to say that there is a minimum torque required from the servomotor to overcome the static friction in the system to provide minimum error at any position null. Thus, even though no control current is applied to the side of the servomechanism not in use, it is being powered to the extent of the so-called "dither" power. Clearly then, a more rapid and efficient system would require a positive cut-off for the side of the servomechanism not in use to prevent the dither torque from bucking the prime torque of the side of the servomechanism which is at that time being powered.

Another shortcoming of the two phase shift-pulse forming servomechanism is that the phase shift-pulse forming portion of the servomechanism is relatively expensive as compared with, for instance, the system herein described. Likewise, the two phase shift-pulse forming network servomechanisms are relatively complex and require a relatively large number of high tolerance components which results in an expensive system. Shortcomings attendant to many servomechanism systems are that often special correcting circuits are required to prevent drift especially in the case where high speed response is required in moving a large mass. Moreover, often a servomechanism, the output of which is required to be linear, is made up of relatively linear circuits which are not quite expensive, but are usually rather critical.

It is, therefore, an object of the present invention to provide a novel servomechanism which utilizes only one phase shift-pulse forming network;

Another object of the present invention is to provide a servomechanism wherein no power is applied in a direction not desired to allow maximum utilization of the desired direction to produce maximum torque;

Another object of the present invention is to provide a relatively simple and inexpensive servomechanism system which is capable of moving a relatively high mass at high output speeds;

Another object of the present invention is to provide a servomechanism system which is composed primarily of non-linear circuits the total system dynamics of which are relatively linear.

Other and further objects and advantages of the invention will be apparent from the following more particular description of the preferred embodiment of the invention as illustrated in the accompanying drawings in which.

Briefly, a servo system is provided which utilizes two pairs of gated pulse amplifiers to control conduction in four silicon control rectifiers, two of which are associated with each winding and phase-shifting capacitor of an associated two phase servomotor. The inputs to the gated pulse amplifiers are from an on-off gate, a direction control circuit for controlling which pair of said gated pulse amplifiers will be on and a pulse position control responsive to error input signals and velocity signals to provide a gating or control pulse during each half-wave of an associated A.C. source. The position of the gating pulse with respect to the A.C. half-cycle varies in accordance with the position error and velocity signals.

Figure 1:
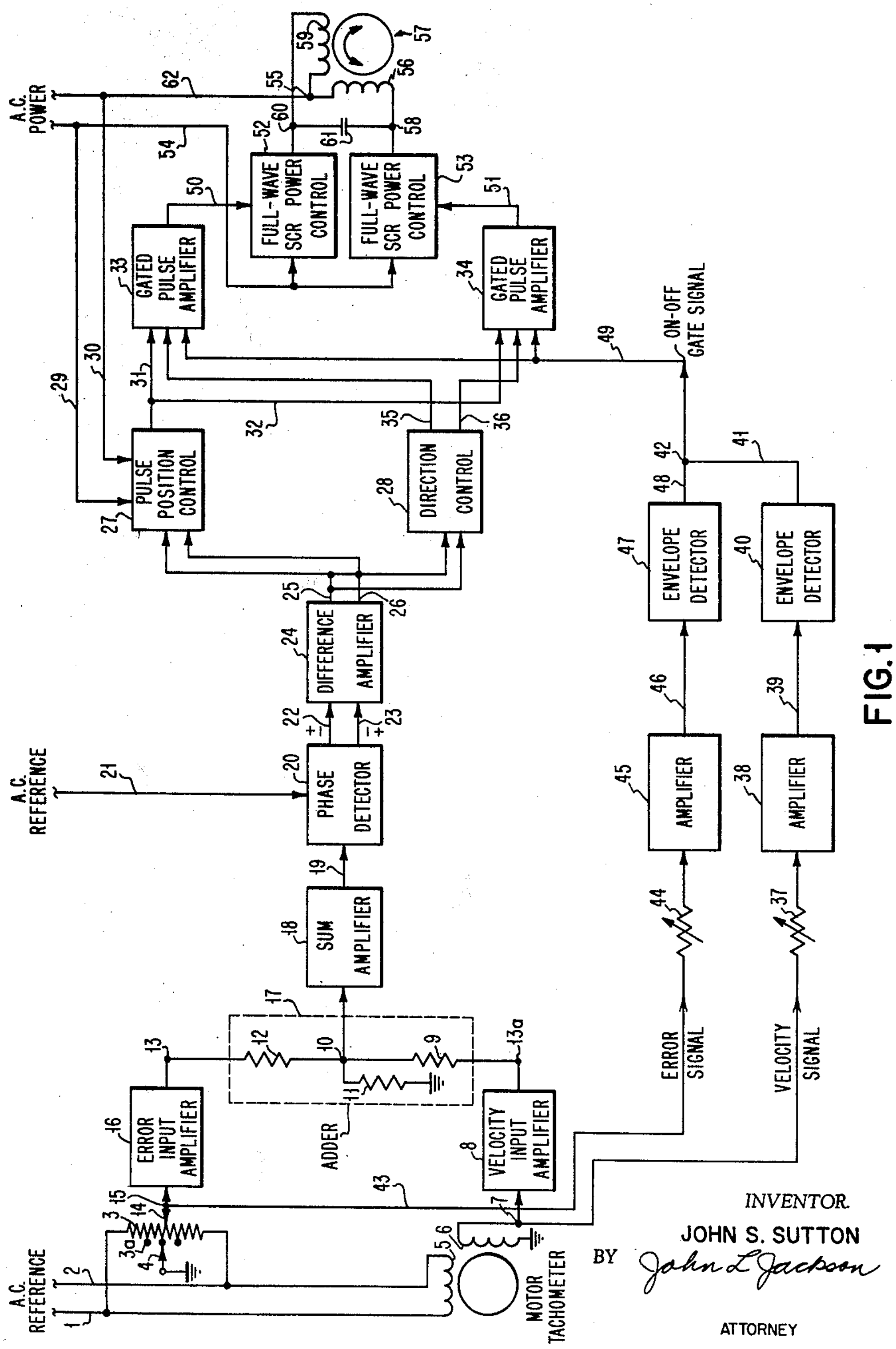
FIG. 1 is an overall system block diagram of the herein described novel servomechanism.

Refer first to FIG. 1 wherein is shown an overall block diagram of the hereinafter described novel servomechanism system. In FIG. 1 is shown an A.C. reference signal applied along lines 1 and 2 across a linear resistance 3 having a plurality of taps 3*a*. A grounding wiper 4 for grounding selected ones of the taps is also provided. The A.C. reference signal applied along lines 12 and 2 is also applied across winding 5 of the motor tachometer. One side of the other winding 6 of the motor tachometer is grounded while the other side thereof is connected to junction 7. Junction 7 is in turn connected to the input of the velocity input amplifier 8, the output of which is connected to one side of resistor 9, the other side of which is connected to junction 10. Junction 10 is also connected to one side of resistor 11, the other side of which is grounded and connected to one side of resistor 12, the other side of which is connected to junction 13. A wiper 14 is connected to junction 15 which is connected to the input of error input amplifier 16. The output of error input amplifier 16 is connected to junction 13.

Resistors 9, 11 and 12 comprise a simple, resistive Kirchhoff summing circuit 17, the output of which is taken from junction 10 and applied to the input of a sum amplifier 18. The output of the sum amplifier 18 is fed along line 19 and constitutes the input to a phase detector 20. An A.C. reference signal is fed along line 21 to the phase detector 20. The output of the phase detector 20 is fed along lines 22 and 23 and constitutes the input to the difference amplifier 24. The output of the difference amplifier 24 is fed along lines 25 and 26 to a pulse position control circuit 27 and direction control circuit 28.

The pulse position control circuit 27 also receives along lines 29 and 30 an A.C. signal from the A.C. power source associated therewith which is in phase with the A.C. reference signals applied to the position transducer, motor tachometer and phase detector. The A.C. input to the pulse position control circuit is not necessarily phased to the reference A.C., but must be phased to the motor A.C. The output of the pulse position control 27 is fed along lines 31 and 32 to the gated pulse amplifiers 33 and 34 respectively.

The output of the direction control circuit 28 is fed along lines 35 and 36 and constitutes a second term of the gated pulse amplifiers 33 and 34 respectively.

Junction 7, which is connected to the second winding 6 of the motor tachometer, is connected through a variable resistor 37 to the input of an amplifier 38, the output of which is connected along line 39 and constitutes the input to an envelope detector 40, the output of which is connected along line 41 to junction 42.

Junction 15 which is connected to the wiper 14 of the position transducer is connected along lines 43 through the variable resistor 44 to the input of amplifier 45. The output of amplifier 45 is fed along line 46 and constitutes the input to an envelope detector 47. The output of the envelope detector 47 is fed along line 48 to junction 42. Junction 42 is connected along line 49 to the gated pulse amplifiers 33 and 34 and, hence, constitutes the third term of the gated pulse amplifiers 33 and 34.

The output of the gated pulse amplifiers 33 and 34 are fed along lines 50 and 51 to full-wave silicon power control units 52 and 53 respectively. The A.C. power source is connected along line 54 to the full-wave silicon power control 52 and 53 and, additionally, is connected to junction 55. Junction 55 is in turn connected to one side of winding 56 of the servomotor 57, the other side of which is connected to junction 58 which in turn is connected to the output of the full-wave silicon power control circuit 53. Junction 55 is also connected to one side of the servomotor winding 59, the other side of which is connected to junction 60 which in turn is connected to the output of the full-wave silicon power control circuit 52. A phase shifting motor capacitor 61 is connected between junctions 60 and 58.

In operation the position transducer 2 is physically connected to the mechanism to be positioned. The position transducer has electrical taps 3 on it corresponding to discrete positions for the mechanism. A particular position, then, is selected by grounding a particular tap 3. The amplitude of the A.C. signal applied to the error input amplifier 16 (error signal) is in direct proportion to the distance through which the mechanism must be moved to reduce the input signal to zero, and the phase of the A.C. error signal will dictate the direction of motion. One particular position transducer which has proved to be ideal for use in the herein described servo system is the subject of a co-pending patent application entitled "A Control System," Serial No. 162,140, assigned to the same assignee as the subject application.

The motor tachometer is connected directly to the servomotor shaft and the A.C. signal therefrom is in direct proportion to the speed and direction of the servomotor. It should be noted that while both the position transducer and the motor tachometer obtained their exciting voltage from essentially the same A.C. reference source along lines 1 and 2, the electrical circuit is so connected that the error signal and the velocity signal are 180° opposite in phase.

The error input amplifier 16 and the velocity input amplifier 8 are essentially isolation amplifiers through which the adder 17 is driven. The adder 17 is a simple, resistive Kirchhoff summing circuit which provides a signal which is the resultant of the two inputs from the error input amplifier 16 and velocity input amplifier 8. Since the error signal and velocity signal are opposite in phase, there is a net subtracting effect and the resulting signal fed to the sum amplifier 18 is proportional to the distance to be moved and the velocity of the system over that distance.

The sum amplifier 18 isolates and amplifies this resultant net signal and applies it to the phase detector 20. The phase detector 20 produces an ouptut D.C. signal the amplitude of which is proportional to the sum voltage and the polarity of which is the resultant of comparing the phase of the sum voltage to the A.C. reference signal applied along line 21. Any of a number of well known phase detectors can be utilized in this application. For instance, one such phase detector is described in "Magnetic Amplifier Performance," Electrical Manufacturing, volume 55, pages 98–101, April 1955.

The output of the phase detector 20 is then applied along lines 22 and 23 to a conventional difference amplifier. A substantial portion of the dynamic gain of the servomechanism is determined by the difference amplifier 24.

Up to this point all of the components and techniques described are well known. The output of the difference amplifier 24 is connected to the direction control 28 which is a special, high gain system which produces a very close distinction of the polarity of the signal from the phase detector 20. The output of the direction control circuit 28 is then applied to the gated pulse amplifiers 33 and 34 and makes it one term thereof. A more detailed description of the direction control 28 will hereinafter be provided.

The output of the difference amplifier 24 is also applied to a pulse position control circuit 27. The pulse position control circuit 27 converts the amplitude of the difference signal to a pulse position modulated signal. The pulse position control 27 is in phase orientation with the A.C. power applied along lines 54 and 62 to the servomotor and the full-wave silicon power control circuits 52 and 53. As will hereinafter become apparent, according to the time that in any given half-cycle of supply voltage at which the power controls 52 and 53 are gated on, the motor power is varied. The pulse position control 27 provides a gating pulse at a point in each half-cycle corresponding to the power required from the motor 57 which is to say according to the level of the D.C. difference signal received from the difference amplifier 24.

The gated pulse amplifiers 33 and 34 receive inputs from the pulse position control circuit 27 which controls motor power from the direction control circuit 28 which controls which of the gated pulse amplifiers 33 or 34 are to be turned on, which in turn depends upon the direction that the servomotor is to travel and from the null detector along line 49 which can be replaced for purposes of the present invention by an on-off gating signal which may be applied from an external source. The pulse amplifiers 33 and 34 are paired with the full-wave silicon power control circuits 52 and 53. According to the direction gating supplied by the direction control 28 and the power required, as determined by the pulse position control 27, the proper set of gated pulse amplifiers 33 and 34 are gated on resulting in the application of a gating pulse to the proper full-wave power control circuit 52 or 53 to produce the direction and power from the two phase A.C. servomotor 57.

The error and velocity signals are in addition to being applied to the adder 17 applied to amplifiers 45 and 38 respectively which in turn drive the envelope detectors 47 and 40. The D.C. outputs from the envelope detectors 47 and 40 are combined into a single signal of correct polarity to provide the on-off gate signal which among other things may be applied to the gated pulse amplifiers 33 and 34. An appropriate gain factor is provided by adjusting the variable resistors 37 and 44 to thereby adjust the level of the error and velocity signals such that the servomechanism is made to position itself within very narrow limits and then turn off all power until a new position tap is selected at the input. The amplifiers 38 and 45 and envelope detectors 47 and 40 merely provide one way of providing an on-off signal to be applied to the gated pulse amplifiers 33 and 34 and are not considered to be important with respect to the subject invention.

The circuits 38, 45, 40 and 47 comprise a gating voltage generator system which drives the gated pulse amplifiers 33 and 34.

If either (1), the error signal is of an amplitude such that its corresponding amplifier 45 and detector 47 produce an output gating voltage on line 48, or (2), the velocity of the motor is such that the tachometer output drives its corresponding amplifier 38 and detector 47 to produce an output gating voltage on line 41, either or both gating voltages being combined at point 42, then the gating voltage enables the pulse amplifiers to supply the control power to the motor, since condition (1) above exists when the system is not at the desired null point, and condition (2) exists when the system is not at rest.

Such circuit operation ascertains that motor power will be applied at all times that the system is either not at null (or very nearly null), or not at zero velocity (or very nearly zero velocity). It is, in effect, an automatic power switch for the servomechanism causing power to be applied to the system whenever it is not at rest, or at a null position.

Figure 2:
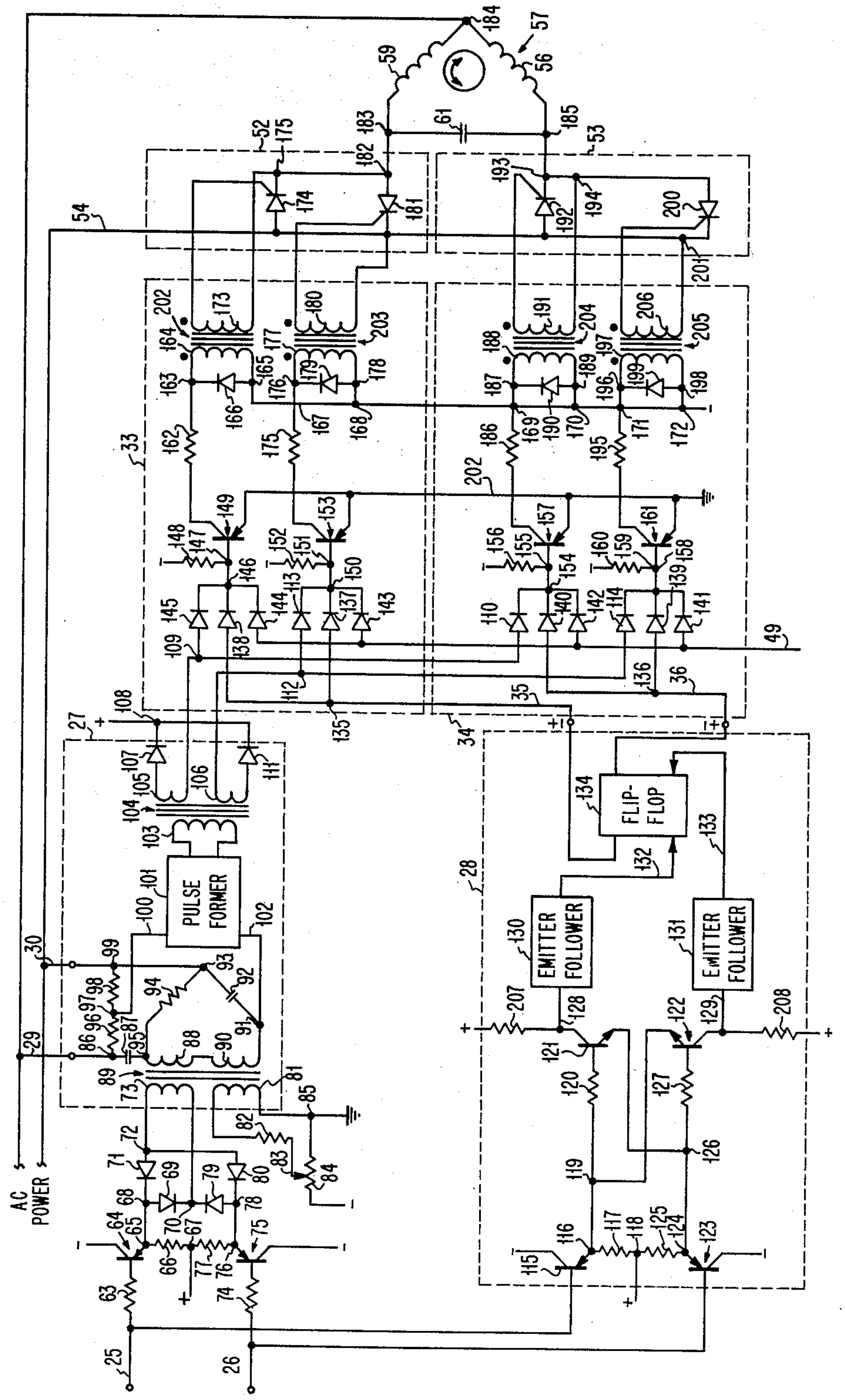
FIG. 2 is a schematic diagram of the pulse position control, direction control, gated pulse amplifiers and full wave silicon power control portions of the block system diagram of FIG. 1.

For a more detailed description refer next to FIG. 2 wherein is shown in detail the novel features of the herein described servomechanism. The input to the schematic of FIG. 2 is from the difference amplifier of FIG. 1 along lines 25 and 26. As will hereinafter become apparent from the following detailed description, the components of the system up to and including the difference amplifier 24 are not in and of themselves important with respect to the inventive features of the servomechanism. Other components and techniques could be utilized equally as well. The important thing is that techniques and components be used which provide on lines 25 and 26 a signal the amplitude of which is proportional to motor power required and the polarity of which is indicative of the direction to be driven. Line 25 is tied through resistor 63 to the base of a PNP transistor 64. The collector of transistor 64 is tied to a negative bias potential while the emitter thereof is tied to junction 65. Junction 65 is connected to one side of a resistor 66, the other side of which is connected to junction 67. Junction 67 is connected to a positive source. Junction 65 is connected to junction 68 which in turn is connected to the anode of diode 69, the cathode of which is connected to junction 70. Junction 68 is also connected to the cathode of diode 71, the anode of which is connected to junction 72. One side of the D.C. control winding 73 is connected to junction 72 while the other side thereof is connected to junction 70.

Line 26 is connected through resistor 74 to the base of PNP transistor 75, the collector of which is connected to a negative potential. The emitter of transistor 75 is connected to junction 76 which in turn is connected to one side of resistor 77, the other side of which is connected to junction 67. Junction 76 is also connected to junction 78 which in turn is connected to the anode of diode 79, the cathode of which is connected to junction 70. Junction 78 is also connected to the cathode of diode 80, the anode of which is connected to junction 72. Diodes 69, 71, 79 and 80 thus comprise a bridge network which functions to provide unidirectional current in control winding 73 irrespective of the polarity of the signal on lines 25 and 26.

A D.C. control winding 81 is connected to one side of a resistor 82, the other side of which is connected to wiper 83 of potentiometer 84. One side of potentiometer 84 is connected to a negative source while the other side thereof is connected to junction 85 which in turn is connected to ground and to the opposite side of the winding 81.

An A.C. reference signal is applied along line 29 to junction 86 which in turn is connected to one side of capacitor 87, the other side of which is connected to junction 95. Junction 95 is also connected to one side of the first load winding 88 of saturable reactor 89 which has the other side thereof connected to one side of the other load winding 90 of saturable reactor 89. The other side of the other load winding of the saturable reactor 89 is connected to junction 91 which in turn is connected to one side of capacitor 92, the other side of which is connected to junction 93. Junction 93 in turn is connected to one side of resistor 94, the other side of which is connected to junction 95. Junction 93 is also connected along line 30 to the A.C. power line 54.

Junction 86 is connected to one side of a resistor 96, the other side of which is connected to junction 97. Junction 97 is connected to one side of resistor 98, the other side of which is connected to junction 99. Junction 97 is also connected along line 100 to a pulse forming circuit 101. Junction 91 is also connected along line 102 to the pulse forming circuit 101. The output of the pulse forming circuit 101 is applied to the primary winding 103 of the pulse transformer 104 having a first secondary winding 105 and a second secondary winding 106. One side of the first secondary winding 105 is connected to the anode of diode 107, the cathode of which is connected to junction 108 which in turn is returned to a positive potential. The other side of the first secondary winding 105 is connected to junction 109 which is connected to the anodes of diodes 110 and 145. One side of the second secondary winding 106 is connected to the anode of diode 111 the cathode of which is connected to junction 108. The other side of the second secondary winding 106 is connected to junction 112. Junction 112 is connected to the anode of diodes 113 and 114.

Input line 25 is also connected to the base of PNP transistor 115 the collector of which is connected to a negative potential and the emitter of which is connected to junction 116. Junction 116 in turn is connected to one side of resistor 117, the other side of which is connected to junction 118 which in turn is connected to a positive source. Junction 116 is also connected to junction 119 which in turn is connected to one side of a resistor 120, the other side of which is connected to the base of NPN transistor 121. Junction 119 is also connected to the emitter of NPN transistor 122.

Line 26 is connected to the base of PNP transistor 123, the collector of which is connected to a negative potential and the emitter of which is connected to junction 124. Junction 124 is also connected to one side of resistor 125, the other side of which is connected to junction 118. Junction 124 is also connected to junction 126 which in turn is connected to one side of resistor 127, the other side of which is connected to the base of transistor 122. Junction 126 is also connected to the emitter of the NPN transistor 121. The collectors of transistors 121 and 122 are connected along lines 128 and 129 to emitter followers 130 and 131, respectively and also connected through collector load resistors 207 and 208, respectively to positive potentials. The output of the emitter followers 130 and 131 are fed along lines 132 and 133 to the input of a D.C. controlled flip flop or trigger 134. The output of the flip flop 134 is fed along line 35 to junction 135 and along line 36 to junction 136. Junction 135 is connected to the anode of diodes 137 and 138 while junction 136 is connected to the anodes of diodes 139 and 140.

Line 49, which, as previously stated, can be connected to an on-off gate or, as previously explained, may be controlled by a null detecting system is connected to the anode of diodes 141, 142, 143 and 144.

The cathodes of diodes 145, 138 and 144 are tied together at junction 146 which in turn is connected to junction 147. Junction 147 is also connected through resistor 148 to a negative potential and connected to the base of PNP transistor 149.

The cathodes of diodes 113, 137 and 143 are tied to junction 150 which in turn is connected to junction 151. Junction 151 is also connected to one side of resistor 152, the other side of which is connected to a negative potential and is also connected to the base of PNP transistor 153.

The cathodes of diodes 110, 140 and 142 are connected to junction 154 which in turn is connected to junction 155. Junction 155 is connected to one side of resistor 156, the other side of which is connected to a negative potential and is also connected to the base of PNP transistor 157.

The cathodes of diodes 114, 139 and 149 are connected to junction 158 which in turn is connected to junction 159. Junction 159 is also connected to one side of resistor 160, the other side of which is connected to a negative potential and is also connected to the base of PNP transistor 161.

The collector of transistor 149 is connected through resistor 162 to junction 163 which in turn is connected to the dot side of the primary winding 164 of the pulse transformer 202. The non-dot side of primary winding 164 is connected to junction 165 which is connected to the anode of diode 166, the cathode of which is connected to junction 163. Junction 165 is connected along line 167 through junctions 168, 169, 170, 171 and 172 to a negative potential.

The dot side of secondary winding 173 is connected to the gate of silicon control rectifier 174, the cathode of which is connected to junction 175.

The anode of the silicon control rectifier 174 is connected to the A.C. power line 54. The collector of transistor 153 is connected through resistor 175 to junction 176 which in turn is connected to the dot side of primary winding 177 of pulse transformer 203. The non-dot side of winding 177 is connected to junction 178 which in turn is connected to junction 168. A diode 179 is connected across the primary winding 177 with its anode connected to junction 178 and its cathode connected to junction 176. The dot side of the secondary winding 180 is connected to the gate of silicon control rectifier 181 which has its anode connected to junction 182 which in turn is connected to junction 175. The non-dot side of secondary winding 180 is connected to the cathode of the silicon control rectifier 181. Junction 182 is connected to junction 183 which is connected to one side of the servomotor winding 59, the other side of which is connected to junction 184. Junction 184 is connected by line 62 to the A.C. power source and connected to one side of winding 56, the other side of which is connected to junction 185. Connected between junctions 183 and 185 is a phase shifting motor capacitor 61.

The collector of transistor 157 is connected through resistor 186 to junction 169 which is in turn connected to junction 187. Junction 187 is connected to the dot side of primary winding 188 of pulse transformer 204. The other side of winding 188 is connected to junction 189. Junction 189 in turn is connected to junction 170. A diode 190 is connected across the primary winding 188 with its anode connected to junction 189 and its cathode connected to junction 187. The dot side of the secondary winding 191 is connected to the gate of the silicon control rectifier 192 which has its anode connected to the A.C. power line 54. The cathode of silicon control rectifier 192 is connected to junction 193 which is in turn connected to junction 185. The non-dot side of winding 191 is connected to junction 194 which is in turn connected to junction 193.

The collector of transistor 161 is connected through resistor 195 to junction 171 which is in turn connected to junction 196. Junction 196 is connected to the dot side of primary winding 197 of pulse transformer 205. The other side of primary winding 197 is connected to junction 198. Junction 198 is connected to junction 172. A diode 199 is connected across primary winding 197 with its anode connected to junction 198 and its cathode connected to junction 196. The dot side of secondary winding 206 is connected to the gate of silicon control rectifier 200, the anode of which is connected to junction 194. The cathode of silicon control rectifier 200 is connected to junction 201 which in turn is connected to the non-dot side of winding 206.

The emitters of transistors 149, 153, 157 and 161 are all grounded by means of line 202.

In operation the differential output of the difference amplifier is applied to lines 25 and 26 as heretofore discussed in the overall system description. This differential signal is then fed into both the pulse position control circuit 27 and the direction control circuit 28. Transistors 64 and 75 are emitter followers which are for purposes of isolating the difference amplifier (FIG. 2) from the following circuitry. The bridge composed of diodes 69, 71, 79 and 80 assures that the amplitude difference of the signals appearing across lines 25 and 26 is the only thing that the control winding 73 of the saturable reactor 89 sees. The polarity of the signal is not important to the pulse position control circuit 27. As will hereinafter become more clear, the amount of current flowing in the control winding 73 determines the position of the pulse produced by the pulse position control circuit 27. The diodes 69, 71, 79 and 80 are connected such that the current flow in control winding 73 is always in one direction regardless of the polarity of the signal applied across lines 25 and 26. The current flowing in winding 73 is, however, proportional to the amplitude of the input signal applied across lines 25 and 26. Potentiometer 84, resistor 82, the negative potential and control winding 81 provide a bias current which is always in the same direction as the current flowing in control winding 73; otherwise, the currents would tend to cancel each other out since the currents in windings 73 and 81 add algebraically. Potentiometer 84 provides an adjustment for zero torque of the servomotor 57 since the positioning of the output pulses furnished by the pulse position control circuit 27 determines the amount of power supplied to the motor 57 in absence of a signal across lines 25 and 26. The bias circuit comprised of potentiometer 84, resistor 82 and winding 81 pre-positions the adjusted null position of the output pulses of the pulse position control circuit 27 so that the motor torque is just enough to break loose from static friction. This corresponds quite closely to what is called a dither in other servomechanisms. Thus, the motor is prevented from going below the static friction level to prevent the occurrence of a broad dead band where no control is exercised over the positioning of the servomechanism. The saturable reactor and phase shift network comprised of capacitor 92, resistor 94 is excited by the same A.C. power which supplies the motor 57. The pulse position control 27 through the saturable reactor, the phase shifting network and the pulse former 101 which functions only to provide rapid rise times, generates two pulses, one pulse for each half-cycle of the A.C. signal. The time position of each pulse within its half-cycle is controlled by the saturable reactor 89 and the current through the control winding 73. The LRC constants of the circuit, in which the inductance appears as a variable parameter in accordance with the D.C. current in the control windings 73 and 81 and the A.C. current in the load windings 88 and 90 determine a point in each half-cycle of the A.C. waveform at which an appropriate signal is generated and driven into the pulse former 101. As the current increases in the control winding 73, the position of the output pulse within the half-cycle is advanced so that when maximum current is in winding 73, the pulse applied to the silicon control rectifiers, as will hereinafter be more fully described, occurs at the leading half of the half-cycle such that if it is applied to the silicon control rectifiers at that instant, the rectifier would fire and the full half-cycle would appear across the motor basically driving full motor torque during that half-cycle. As the amount of current to the pulse position control unit 27 is reduced, the pulses are retarded further and further in time until at zero current input they occur at the trailing edge of the half-cycle such that if they are then applied to the silicon control rectifiers, they will fire just at the instant that the A.C. voltage is coming back down to zero and no power is applied to the associated winding of the servomotor. Instead of going directly to the silicon control rectifiers as in the usual case, in the subject circuit the pulse position control 27 is utilized as a pulse generator to drive the gated pulse amplifiers 33 and 34. Thus, the pulse position control 27 furnishes a gating pulse properly positioned to provide the correct amount of torque which the motor will have to develop corresponding to the amount of signal which is applied across the input lines 25 and 26.

Lines 25 and 26 are also connected to the emitter followers 115 and 123 which are used to isolate the difference amplifier from the direction control circuitry. The pair of transistors 121 and 122 are connected in such a fashion that they are driven by the difference of the signal between the emitter and base thereby providing maximum possible gain. The signal appearing on lines 25 and 26 is essentially a push-pull signal and since the emitter of each transistor is connected across to the base of the other transistor, instead of one-half the input signal being applied, the total input signal is available from base to emitter. When the difference amplifier is sensing a null position, the input signal applied on lines 25 and 26 is zero, but that level may drift around according to the common mode rejection characteristics of the difference amplifier. The cross-coupled transistors are so connected so that the circuit will derive its entire drive from the difference signal and not from the drift of the input signal with respect to the power supply associated therewith. Thus, transistors 121 and 122 are returned only to a positive power supply and the negative half or the other return is in effect the difference amplifier return because the emitters derive their signal currents from emitter followers 115 and 116 which are driven by the difference amplifier. Therefore, since the emitter followers 115 and 116 drive the direction control circuit, sufficient power is provided at the level the difference amplifier determines, not at the level the power supply determines and, therefore, the amount of common mode D.C. amplification that occurs in the direction control circuit 28 is reduced by not restricting it to operate from the power supply only. Thus, in effect what is provided is high gain in the difference circuit, but a net gain of one or slightly less than one in the common mode portion while in turn providing a very highly discriminating determination of the polarity of the difference amplifier output.

Following the direction control transistors 121 and 122 are emitter followers 130 and 131 which again are used for isolation purposes. The emitter followers 130 and 131 drive a D.C. controlled flip-flop 134 which functions as an amplifier in that it provides rather high gain. The direction control circuit permits the flip-flop 134 to be driven with little concern over the fact that the flip-flop 134 is tied directly back to a power supply. Thus, the common mode level shift has been held to a minimum so that the flip-flop 134 now is in essence receiving a switching signal whose amplitude is far greater than the common mode drift. The flip-flop 134 also provides good sharp wave fronts and amplification of the highly discriminated signal. Thus, the actual direction control gating signals are provided by flip-flop 134 on lines 35 and 36 which lines make up one input to the gated pulse amplifiers 34 and 33 respectively. The signals appearing on lines 35 and 36 are thus used to determine which pair of gated pulse amplifiers 33 and 34 are to be turned on.

Transistors 149, 153, 157 and 161 all have three way AND gates on their inputs. One of the inputs is a drive pulse from the pulse position control unit 27. Another input is from the direction control circuit 28 along lines 35 and 36. A third input is from an on-off gate which may be controlled externally or may be controlled by means of envelope detectors as heretofore described with respect to FIG. 1. Thus, there are three inputs to each one of the transistors 149, 153, 157 and 161. The direction control circuit 28 determines which pair of transistors 149, 153 or 157 and 161 will be driven. The time variable pulses furnished by the pulse position control circuit 27 are distributed such that for the positive half-cycle of the A.C. line a pulse will appear at the anodes of diodes 145 and 110 while for the negative half-cycle of the A.C. signal, a pulse will appear on the anodes of diode 113 and 114. Which of the gates will actually come true is dependent upon the condition of the flip-flop 134. Thus, assuming that the pulse amplifier 33 provides counter-clockwise rotation, for each half-cycle of the A.C. signal, transistor 149 will conduct a pulse and then transistor 153 will conduct etc. For clockwise rotation, transistor 157 will conduct during one half-cycle and then transistor 161 will conduct for the other half-cycle etc.

Pulse transformers 202, 203, 204 and 205 are simply classical pulse transformers selected to be compatible with the type of silicon control rectifiers used. They are used basically for coupling and not necessarily for their timing characteristics. Diodes 166, 179 190, 199 are to suppress the inductive kick from the pulse transformer when the pulse current is shut off. Four silicon control rectifiers 174, 181, 192 and 200 which constitute the power control circuitry, are again paired in accordance with the direction that the motor is to be driven. That is to say that, assuming counter-clockwise rotation is desired during one-half cycle, silicon control rectifier 174 would fire and during the next half-cycle, silicon control rectifier 181 would fire etc. The same holds true for the silicon control rectifiers 192 and 200. The motor itself may be, for instance, a two-phase motor using a capacitor 61 for phase shifting to provide direction. Thus, the two windings are connected together at junction 184 and the other ends of the windings are connected across the phase shifting capacitor 61. The application of A.C. power to junction 184 and to one of junctions 183 or 185 will cause the motor to rotate in a selected direction. Depending on which side the A.C. line is connected to, the motor will rotate clockwise or counter-clockwise. The control rectifiers are thus doing the same job that an electrical switch would do, but since they are thyraton-like and turn off each half-cycle when the anode voltage goes to zero there must be a pair back to back which are fired each half-cycle.

As previously stated, the silicon control rectifier is a thyraton-like device which, if a positive signal is applied between the gate and cathode while there is a positive voltage on the anode, the control rectifier goes into a state of conduction and stays turned on even if the gate voltage disappears. It continues to conduct until the circuit is broken or until the anode voltage goes to substantially zero. Therefore, if a silicon control rectifier is fired at any time during a half-cycle when that one half-cycle returns to its zero crossing, the rectifier will turn off. Thus, for each half-cycle of the A.C. signal, a silicon control rectifier is required. As is apparent then, the amount of power that the motor 57 gets from the silicon control rectifiers is determined by the position of the pulse produced by the pulse position control circuit 27. If the pulse occurs at substantially half-way of the half-cycle, the motor will develop substantially half-power. If it is turned on at the beginning of the half-cycle, the motor will develop substantially full power etc.

As the input varies according to the position of the mass being positioned, the time at which the control rectifiers fire varies and, consequently, the amount of motor torque varies. As the zero point or null position of the position mass is crossed, the direction control circuit 28 senses that the mass has gone too far and the opposite set of gated pulse amplifiers 33 or 34 are turned on to commence the firing sequence of their associated silicon control rectifiers to provide drive to the motor on the other side of capacitor 61 to provide drive in the opposite direction until the null position is again crossed.

In summary, a servo system which utilizes two pairs of gated pulse amplifiers 33 and 34 to control conduction in four silicon control rectifiers 174, 181, 192 and 200, two of which are associated with each winding 56 and 59 and phase shifting capacitor 61 of an associated two-phase servomotor 57. The inputs to the gated pulse amplifiers 33 and 34 are from an on-off gate or null detector along line 49, a direction control circuit 28 for controlling which pair of said gated pulse amplifiers will be on and a pulse position control 27 responsive to error input signals and velocity signals to provide a gate or control pulse during each half-wave of an associated A.C. source. The position of the gating pulse with respect to the A.C. half-cycle varies in accordance with the position error and velocity signals to in turn control the amount of power supplied by the silicon control rectifiers to the servomotor 57.

Thus, there has been provided a novel servomechanism which utilizes only one phase shift-pulse forming network which results in a relatively simple and inexpensive servomechanism which is capable of moving a relatively high mass at high output speeds. Additionally, the herein described servomechanism utilizes a positive electrical cut-off to prevent "dither" power from being applied to a winding in opposition to the prime power being applied to the other winding of the servomotor to provide a highly efficient servomechanism while at the same time providing a "dither" technique to greatly reduce the dead band of the servo system. Moreover, while the herein described servomechanism is composed primarily of relatively inexpensive non-linear circuits, the total system dynamics are relatively linear.

While the invention has been particularly shown and described with reference to a preferred embodiment thereof, it will be understood by those skilled in the art that various changes in the form and details may be made therein without departing from the spirit and scope of the invention.

What is claimed is:

1. A servo system comprising:
a servo motor having first and second windings,
means for providing an error signal the amplitude of which is indicative of required motor power and the plurality of which is indicative of required motor direction,
means for selectively applying power to said first and second windings responsive to said error signal providing means comprising:
a pulse position control,
a direction control,
first and second gated pulse amplifiers connected to both said pulse position control and said direction control,
a first full wave power control connected to said first gated pulse amplifiers,
a second full wave power control connected to said gated pulse amplifiers, and
said first full wave power control connected to said first winding of said servo motor and said second full wave power control being connected to said second winding of said servo motor.

2. A servo mechanism wherein an error signal is provided the amplitude of which is indicative of power to be applied to an associated servo motor having first and second windings and the polarity of which is indicative of which of said windings is to be powered comprising:
a pulse position control receptive of said error signal,
a direction controlled receptive of said error signal,
first and second pairs of gated pulse amplifiers connected to said both said pulse position control and said direction control,
first and second full wave power controls, said first pair of gated pulse amplifiers connected to said first full wave power control,
said second pair of gated pulse amplifiers connected to said second full wave power control,
said first full wave power control connected to said first winding of said motor,
said second full wave power control connected to said second winding of said motor, and
an A.C. power source connected to said pulse position control, to said first and second full wave power controls and to said motor windings.

3. A servo mechanism wherein an error signal is provided the amplitude of which is indicative of power to be applied to an associated servo motor having first and second windings and the polarity of which is indicative of which of said windings is to be powered comprising:
means receptive of said error signal for providing an output pulse the timing of which is responsive to the amplitude of the error signal,
a direction control receptive of said error signal,
first and second pairs of gated pulse amplifiers connected to both said pulse provision means and said direction control,
first and second full wave power controls,
said first pair of gated pulse amplifiers connected to said first full wave power control,
said second gated pulse amplifiers connected to said second full wave power control,
a first full wave power control connected to said first winding of said motor,
a second full wave power control connected to said second winding of said motor, and
an A.C. power source connected to said pulse provision means, to first and second full wave power controls and to said motor windings.

4. A servo mechanism wherein an error signal is provided the amplitude of which is indicative of power to be applied to an associated servo motor having first and second windings and the polarity of which is indicative of which of said windings is to be powered comprising:
means receptive of the error signal for providing an output pulse the timing of which varies with the ampiltude of the error signal,
means receptive of said error signal for providing on two output lines thereof an electrical signal indicative of the direction to be driven,
a first pair of gated pulse amplifiers connected to said pulse provision means and said first output line of said direction provision means,
a second pair of gated pulse amplifiers connected to both said pulse provision means and said second output line of said direction provision means,
first and second full wave power controls,
said first pair of gated pulse amplifiers connected to said first full wave power control,
said second pair of gated pulse amplifiers connected to said second full wave power control,
said first full wave power control connected to said first winding of said motor,
said second full wave power control connected to said second winding of said motor, and
an A.C. power source connected to said pulse provision means, to said first and second full wave power controls and to said motor windings.

5. A servo mechanism wherein an error signal is provided the amplitude of which is indicative of power to be applied to an associated servo motor having first and second windings and the polarity of which is indicative of which of said windings is to be powered comprising:
a pulse position control receptive of said error signal,
a direction control receptive of said error signal,
first and second pairs of gated pulse amplifiers each having an AND gate on the input thereof,
each of said AND gates being receptive of signals from said pulse position control and said direction control,
first and second full wave power controls,
said first pair of gated pulse amplifiers connected to said first full wave power control,
said second pair of gated pulse amplifiers connected to said second full wave power control,
said first full wave power control connected to said first winding of said motor,
said second full wave power control connected to said second winding of said motor, and
an A.C. power source connected to said pulse position control, to said first and second full wave power controls and to said motor windings.

6. A servo mechanism wherein an error signal is provided the amplitude of which is indicative of power to be applied to an associated servo motor having first and second windings and the polarity of which is indicative of which of said windings is to be powered comprising:
a pulse position control receptive of said error signal,
a direction control receptive of said error signal,
first and second pairs of gated pulse amplifiers connected to both said pulse position control and said direction control,
a first pair of silicon control rectifiers connected to said first pair of gated pulse amplifiers,
a second pair of silicon control rectifiers connected to said second pair of gated pulse amplifiers,
said first pair of silicon control rectifiers connected to said first winding of said motor,
said second pair of silicon control rectifiers connected to said second winding of said motor, and
an A.C. power source connected to said pulse position control, to said first and second full wave power controls and to said motor windings.

7. A servo mechanism wherein an error signal is provided the amplitude of which is indicative of power to be applied to an associated servo motor having first and second windings and the polarity of which is indicative of which of said windings is to be powered comprising:
a pulse position control receptive of said error signal,
a direction control receptive of said error signal,
first and second pairs of gated pulse amplifiers each having an AND gate on the input thereof,
each of the AND gates connected to both said pulse position control and said direction control,
a first pair of silicon control rectifiers connected to said first pair of gated pulse amplifiers,
a second pair of silicon control rectifiers connected to said second pair of gated pulse amplifiers,
said first pair of silicon control rectifiers connected to said first winding of said motor,
said second pair of silicon control rectifiers connected to said second winding of said motor, and
an A.C. power source connected to said pulse position control, to said first and second full wave power controls and to said motor windings.

8. A servo mechanism wherein an error signal is provided the amplitude of which is indicative of power to be applied to an associated servo motor having first and second windings and the polarity of which is indicative of which of said windings is to be powered comprising:
means receptive of said error signal for providing an output pulse the timing of which varies with the amplitude of said error signal,
a direction control having first and second output lines receptive of said error signal for providing an output signal on said first and second output lines responsive to the polarity of said error signal indicative of the direction to be moved,
first and second pairs of gated pulse amplifiers each having an AND gate on the input thereof,
the AND gates of said first pair of gated pulse amplifiers connected to said pulse provision means and to said first output winding of said direction control,
the AND gates of said second pair of gated pulse amplifiers connected to said pulse provision means and to said second output line of said direction control,
first and second full wave power controls,
said first pair of gated pulse amplifiers connected to said first full wave power control,
said second pair of gated pulse amplifiers connected to said second full wave power control,
said first full wave power control connected to said first winding of said servo motor,
said second full wave power control connected to second winding of said motor, and
an A.C. power source connected to said pulse provision means, to said first and second full wave power controls and to said windings.

References Cited by the Examiner

UNITED STATES PATENTS

| | | | |
|---|---|---|---|
| Re. 23,275 | 10/50 | Field | 318—207 |
| 2,892,945 | 6/59 | Ule | 318—207 |
| 2,913,146 | 11/59 | Dickerson | 318—28 |
| 3,003,096 | 10/61 | Du Bois | 318—207 |
| 3,050,672 | 8/62 | Alexanderson | 318—257 |
| 3,083,327 | 11/63 | Byloff | 318—257 |

JOHN F. COUCH, *Primary Examiner.*

UNITED STATES PATENT OFFICE
CERTIFICATE OF CORRECTION

Patent No. 3,181,046 April 27, 1965

John S. Sutton

It is hereby certified that error appears in the above numbered patent requiring correction and that the said Letters Patent should read as corrected below.

Column 11, line 58, after "said" insert -- second --; column 12, line 34, after "to" insert -- said --.

Signed and sealed this 21st day of September 1965.

(SEAL)
Attest:

ERNEST W. SWIDER
Attesting Officer

EDWARD J. BRENNER
Commissioner of Patents